June 11, 1935.  J. F. LEVENTHAL  2,004,120
OPTICAL COMPENSATOR
Original Filed June 7, 1930
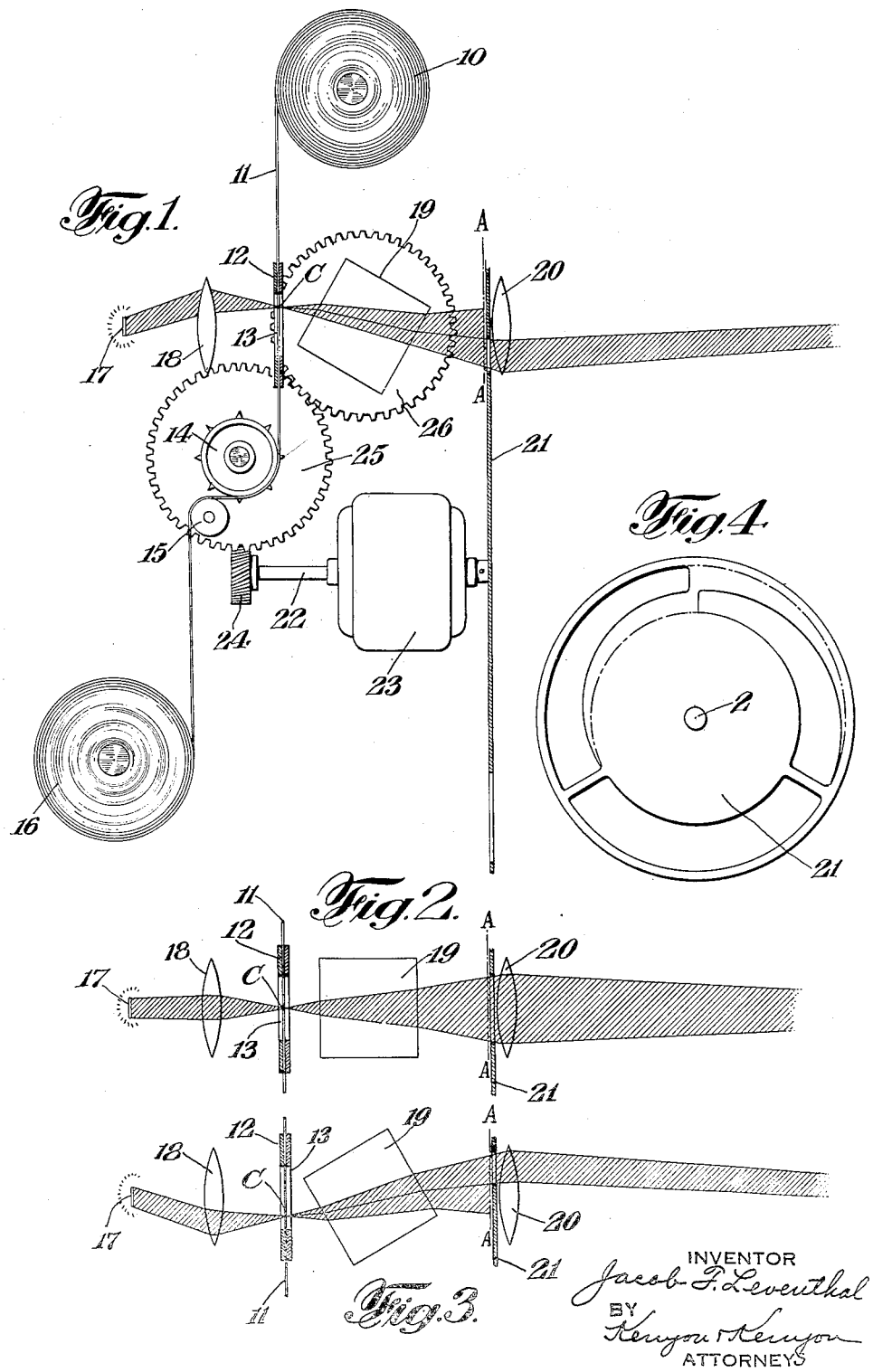
INVENTOR
Jacob F. Leventhal
BY
Kenyon & Kenyon
ATTORNEYS Patented June 11, 1935

2,004,120

UNITED STATES PATENT OFFICE 2,004,120

OPTICAL COMPENSATOR

Jacob F. Leventhal, New York, N. Y., assignor, by mesne assignments, to Leventhal Patents, Incorporated, a corporation of Delaware Application June 7, 1930, Serial No. 459,660
Renewed July 14, 1934

9 Claims. (Cl. 88—16.8)

This invention relates to motion picture projectors in which optical compensators comprising rotating plane-parallel refracting means are utilized to produce stationary images of pictures on a film advanced at a uniform rate. Optical compensators of this type are disclosed in detail in my Patents Nos. 1,829,349 and 1,935,572.

In optical compensators of this type, objectionable astigmatism is produced during the opening and closing periods of a picture cycle due to the angularity of the plane-parallel surfaces at such times with respect to the optical axis. During the opening and ending periods of the picture cycles the light rays comprising a portion of the light pencil emanating from any point on the film meet the plane-parallel surfaces at such angularity as to produce the objectionable astigmatism. This condition prevails in the light pencils emanating from all points on the film. As the picture cycle progresses, the angularity between the light rays and reciprocating members progressively changes and the astigmatism is reduced until, under normal conditions, it is unobjectionable through the central portion of the picture cycle. However, as the picture cycle nears its ending, other rays in the light pencil meet the plane-parallel refracting surfaces at such angle that the objectionable astigmatism is again produced and such astigmatism progressively increases until the end of the cycle is reached.

An object of this invention is to reduce the astigmatism during the opening and closing periods of the picture cycle to such a degree that it is unobjectionable.

According to the present invention, the objectionable astigmatism near the beginning and ending of the picture cycle is reduced by progressively masking out the light rays which meet the plane-parallel surfaces at such angularity as to produce the astigmatism above referred to. The masking may be effected by means of a screen rotated in timed relation to the compensator and being of such design as to intercept the rays which would otherwise produce the objectionable astigmatism.

Other objects, novel features and advantages of this invention will be apparent from the following specification and accompanying drawing, wherein:

Fig. 1 is a diagrammatic illustration of one embodiment of the invention.

Figs. 2 and 3 are similar fragmentary views at different stages of the picture cycle, and Fig. 4 is a face view of the screen.

In Fig. 1, 10 is a supply reel from which a motion picture film 11 is drawn through a gate 12 having an aperture 13 equal in height to two pictures on the film. The film then passes to a feed sprocket 14 by which the film is caused to advance at a uniform rate of speed. From the sprocket 14 the film passes around a roller 15 and thence to the take-up reel 16. Light from any suitable source 17 is directed through the film by means of the condenser 18 which is adapted to form an image of the source 17 in a plane A—A. An optical compensator 19 is provided for displacing the light beam to compensate for the feed of the film. This compensator is here illustrated only diagrammatically to illustrate the principle involved and to make the disclosure as simple as possible. However, this compensator preferably is of the type disclosed in my co-pending applications, Serial No. 217,485, filed September 3, 1927, and Serial No. 305,901, filed September 14, 1928.

An objective lens 20 is provided for focusing the image on a screen and between it and the compensator 19 there is provided a screen 21 mounted on one end of the armature shaft 22 of the motor 23. A spiral gear 24 is carried by the shaft 22 and meshes with teeth of the driving gear for the sprocket 14, the gear 25 also being in mesh with the drive gear 26 of the compensator 19. The compensator 19 is shown as being provided with four plane-parallel surfaces and therefore the gears 24 and 25 have a 1 to 4 ratio, while the gears 25 and 26 have a 1 to 1 ratio. Thus the film is advanced four pictures for each rotation of the compensator and the screen 21 is rotated once for each picture cycle. The screen 21 is arranged substantially in the plane A—A which is adjacent an aperture-stop plane of the optical system. The screen is provided with a substantially annular aperture, the ends of which taper rather sharply until they are approximately one-half the width of the central portion, the ends being offset from each other as shown in Fig. 4.

In order to make the disclosure as simple as possible, the description of the operation of the above described apparatus will be limited to the consideration of a single light pencil, namely, the light pencil emanating from the mid-point C of a picture, but it is to be understood that substantially the same conditions exist with respect to all the light pencils emanating from a picture.

Fig. 1 shows the position assumed by the various elements just after the start of a picture cycle. As will be evident from a consideration of this figure, the rays in the upper portion of the light pencil meet the refracting surfaces at large angles of incidence and this condition is productive of objectionable astigmatism.

At the mid-point of the picture cycle, the elements are in the position shown in Fig. 2 and in this position, the angularity of the rays is such that no objectionable astigmatism is produced. This condition exists over a central period of the picture cycle, such period beginning prior to and ending after the mid-point of the cycle.

In Fig. 3 there is disclosed the relationship of the various elements near the end of a picture cycle and in this position the objectionable astigmatism again is produced, but it is produced by light rays in the opposite portion of the light pencil from that containing the rays which produced the undesirable astigmatism when the elements were in the relationship shown in Fig. 1.

The aperture in the screen 21 is so designed that during the central portion of the picture cycle, the passage of light rays to the lens 20 is unobstructed. Near each end, the aperture decreases progressively in width so that during the opening and closing periods of the picture cycle predetermined portions of each light pencil are intercepted, these portions being those which contain the light rays which unless intercepted would produce the objectionable astigmatism.

As shown in Fig. 1, the screen 21 at the beginning of a picture cycle cuts off that portion of the light pencil containing rays making large angles of incidence with the plane-parallel refracting surfaces. Reference to Fig. 2 shows the screen in such position as to permit the complete light pencil to pass to the lens 20. In Fig. 3, the screen 21 is shown in position where it again intercepts that portion of the light pencil containing rays making large angles of incidence with the plane-parallel surfaces.

The compensator 19 suitably bends rays emanating from the moving point C to present to the lens 20 an apparently stationary point. During those periods in the cycle where the angularity between light rays and the plane-parallel surfaces is such as to produce objectionable astigmatism, the astigmatism producing rays are intercepted due to the shape of the aperture in the screen 21. During the central portion of the cycle, where the angularity is such that objectionable astigmatism is not produced, the complete light pencil passes to the lens 20 because of the increased width of the central portion of the angular aperture. Different portions of the light pencil have to be eliminated during the opening and closing periods of the picture cycle because of the reversal of angularity of the plane-parallel refracting surfaces and to take care of this situation the ends of the aperture in the screen 21 are offset so as to permit passage of the rays which do not produce objectionable astigmatism, while intercepting the rays which otherwise would produce the objectionable astigmatism.

It is of course to be understood that various modifications may be made in the structure above described, without in any way departing from the spirit of the invention as defined in the appended claims.

I claim:

1. In combination, an optical compensator comprising a light source, rotatable plane-parallel refracting means, means to feed a film between said light source and refracting means, means to rotate said refracting means at uniform speed and to feed said film in synchronism therewith, optical means to direct a light beam through said film and refracting means, a rotatable screen arranged to intercept said beam in a plane removed from the film plane, said screen being provided with a substantially annular aperture tapered at each end and having its ends offset, and means to rotate said screen in timed relation to a picture cycle.

2. In combination, an optical compensator comprising a light source, rotatable plane parallel refracting means, means for feeding a film between said light source and refracting means, means to rotate said refracting means at uniform speed and to actuate said film feeding means in synchonism therewith, optical means associated with said light source to direct a light beam through said film and said refracting means and to produce an image of said light source, a rotatable obturator arranged to intercept said beam in the plane of said light source image, said obturator being provided with a light transmitting slot tapered at each end and having its ends offset, and means to rotate said screen in timed relation to a picture cycle.

3. In combination, an optical compensator comprising a light source, rotatable plane parallel refracting means, means for feeding a film between said light source and refracting means, means to rotate said refracting means at uniform speed and to actuate said film feeding means in synchronism therewith, optical means associated with said light source to direct a light beam through said film and said refracting means, a rotatable obturator arranged to intercept said beam in a plane removed from the film plane, said obturator having an arcuate slot of less width at its ends than centrally and having its ends offset in the direction of film travel and means to rotate said obturator in timed relation to a picture cycle.

4. In combination, an optical compensator comprising a light source, rotatable plane parallel refracting means, means for feeding a film between said light source and refracting means, means to rotate said refracting means at uniform speed and to actuate said film feeding means in synchronism therewith, optical means associated with said light source to direct a light beam through said film and refracting means and to produce an image of said light source, a rotatable disk lying in the plane of said light source image, said screen being provided with a light transmitting arcuate slot of greater width centrally than at its ends and having its ends at different distances from the rotational axis of the disk, and means to rotate said disk in timed relation to a picture cycle.

5. In combination, an optical compensator comprising a light source, rotatable plane parallel refracting means, means for feeding a film between said light source and refracting means, means to rotate said refracting means at uniform speed and to actuate said film feeding means in synchronism therewith, optical means associated with said light source to direct a light beam through said film and said refracting means, a rotatable disk lying in a plane removed from the film plane, said disk being provided with an arcuate light transmitting slot of greater width centrally than at its ends and having its ends differently spaced from the rotational axis of said disk, and means to rotate said disk in timed relation to a picture cycle.

6. A motion picture apparatus comprising means to feed film at uniform linear speed, an objective lens for imaging the film at a screen plane, means to pass a beam of light through said film to said lens, a rotatable optical compensator between said film and lens having plane parallel faces interceptive of the optical axis of said lens for compensating the motion of the film during a compensation cycle, said cycle comprising rotation of the compensator from a position of angular relation between the film and a compensator face through a position of parallel relation to a position of equal but opposite angular relation, means for rotating said compensator through a compensating cycle while the film is advanced a predetermined distance, movable light restricting means arranged adjacent an aperture-stop plane of said lens, and means for moving said light restricting means through an operating cycle in timed relation with the rotation of said compensator through a compensating cycle, said restricting means having a varying light transmitting area effective to pass the full beam of light when the compensator is in its intermediate position and when the compensator is in other positions to exclude from the screen image the light rays striking the compensator at greater than a predetermined angle of incidence.

7. A motion picture apparatus according to claim 6, in which said light restricting means comprises an obturator having a slot of greater height at its central portion than at its ends.

8. A motion picture apparatus according to claim 6 in which the light restricting means comprises a rotating disk having an annular slot of greater height at its central portion than at its ends, said ends being radially offset.

9. A motion picture apparatus comprising means to feed film at uniform linear speed, an objective lens for imaging the film on a screen plane, means to pass a beam of light through said film to said lens, a rotatable optical compensator between said film and lens having plane-parallel faces interceptive of the optical axis of said lens for compensating the motion of the film during a compensation cycle, said cycle comprising rotation of the compensator from a position of angular relation between the film and a compensator face through a position of parallel relation to a position of equal but opposite angular relation, means for rotating said compensator in synchronism with the film through a compensating cycle while the film is advanced a predetermined distance, movable light controlling means interceptive of the light beam for limiting, in the direction of compensation, the image forming rays of the picture pencils to rays making less than a predetermined angle of incidence with the compensator face and passing rays of the pencils making an angle of incidence less than the said predetermined angle of incidence, and means for moving said light controlling means through an operating cycle in predetermined timed relation with rotation of said compensator through a compensating cycle.

JACOB F. LEVENTHAL.